United States Patent [19]

Stats

[11] Patent Number: 5,512,070

[45] Date of Patent: Apr. 30, 1996

[54] TWO STAGE CARBONIZER

[75] Inventor: David A. Stats, Richfield, Ohio

[73] Assignee: The Babcock & Wilcox Company, New Orleans, La.

[21] Appl. No.: 390,905

[22] Filed: Feb. 16, 1995

Related U.S. Application Data

[63] Continuation of Ser. No. 127,858, Sep. 28, 1993, abandoned.

[51] Int. Cl.$^6$ .................................................. C10J 3/56
[52] U.S. Cl. .................... 48/76; 48/63; 48/77; 201/31; 202/99; 202/121; 422/139
[58] Field of Search ............................ 48/67, 77, 73, 48/63, 64, 76, 62 R; 422/142, 139, 145, 196, 147; 110/245, 229, 230; 122/4 D; 201/31; 202/99, 215, 121

[56] References Cited

U.S. PATENT DOCUMENTS

| | | | |
|---|---|---|---|
| 2,623,815 | 12/1952 | Roetheli et al. | 48/73 |
| 2,680,065 | 6/1954 | Atwell | 48/202 |
| 2,683,657 | 7/1954 | Garbo | 48/202 |
| 3,250,591 | 5/1966 | Bergholm et al. | 23/48 |
| 3,322,492 | 5/1967 | Flood | 23/46 |
| 3,523,864 | 8/1970 | Osterman et al. | 162/30.1 |
| 3,578,396 | 5/1971 | Priestley | 23/48 |
| 3,711,593 | 1/1973 | Shick et al. | 423/207 |
| 3,867,110 | 2/1975 | Schora et al. | 201/31 |
| 3,884,649 | 5/1975 | Matthews | 201/31 |
| 3,920,417 | 11/1975 | Fernandes | 48/197 R |
| 4,041,141 | 8/1977 | Moss | 423/571 |
| 4,069,024 | 1/1978 | Fernandes | 48/197 R |
| 4,279,207 | 7/1981 | Wormser | 110/345 |
| 4,300,914 | 11/1981 | Rice | 422/142 |
| 4,347,064 | 8/1982 | Reh et al. | 207/31 |
| 4,409,094 | 10/1983 | Longwell et al. | 208/121 |
| 4,421,629 | 10/1983 | York et al. | 208/8 R |
| 4,490,157 | 12/1984 | Fernandes | 48/62 R |
| 4,579,070 | 4/1986 | Lin et al. | 110/345 |
| 4,681,065 | 7/1987 | Bergkvist | 422/142 |
| 4,799,937 | 1/1989 | Nieminen | 422/142 |
| 5,012,750 | 5/1991 | Sheely et al. | 110/245 |
| 5,059,404 | 10/1991 | Mansour et al. | 423/201 |
| 5,089,031 | 2/1992 | Kikuchi et al. | 48/77 |
| 5,092,984 | 3/1992 | Babu et al. | 201/31 |
| 5,243,922 | 9/1993 | Rehmat et al. | 48/77 |

FOREIGN PATENT DOCUMENTS

| 092000801 | 1/1992 | WIPO | 422/142 |
|---|---|---|---|

OTHER PUBLICATIONS

Rehmat, A. and Goyal, A., "Advanced Staged Combustion System for Power Generation", Fluidized Bed Combustion vol. 2, ASME 1993.

*Primary Examiner*—Peter Kratz
*Attorney, Agent, or Firm*—Daniel S. Kalka; Robert J. Edwards

[57] ABSTRACT

A two stage carbonizer places as much heat as possible into the gas streams entering the carbonizer to drive off volatile matter and reduce tars and oils by thermal cracking which is enhanced by the addition of sorbent. The carbonizer operates as a fluidized bed with a combustor providing flue gas as one fluidizing medium and preheated air as the other. This allows the coal to be devolatilized and the tars and oils to be thermally cracked due to the direct contact with the coal and hot flue gas. The device is designed to operate at high pressures from about 12–20 atmospheres.

8 Claims, 1 Drawing Sheet

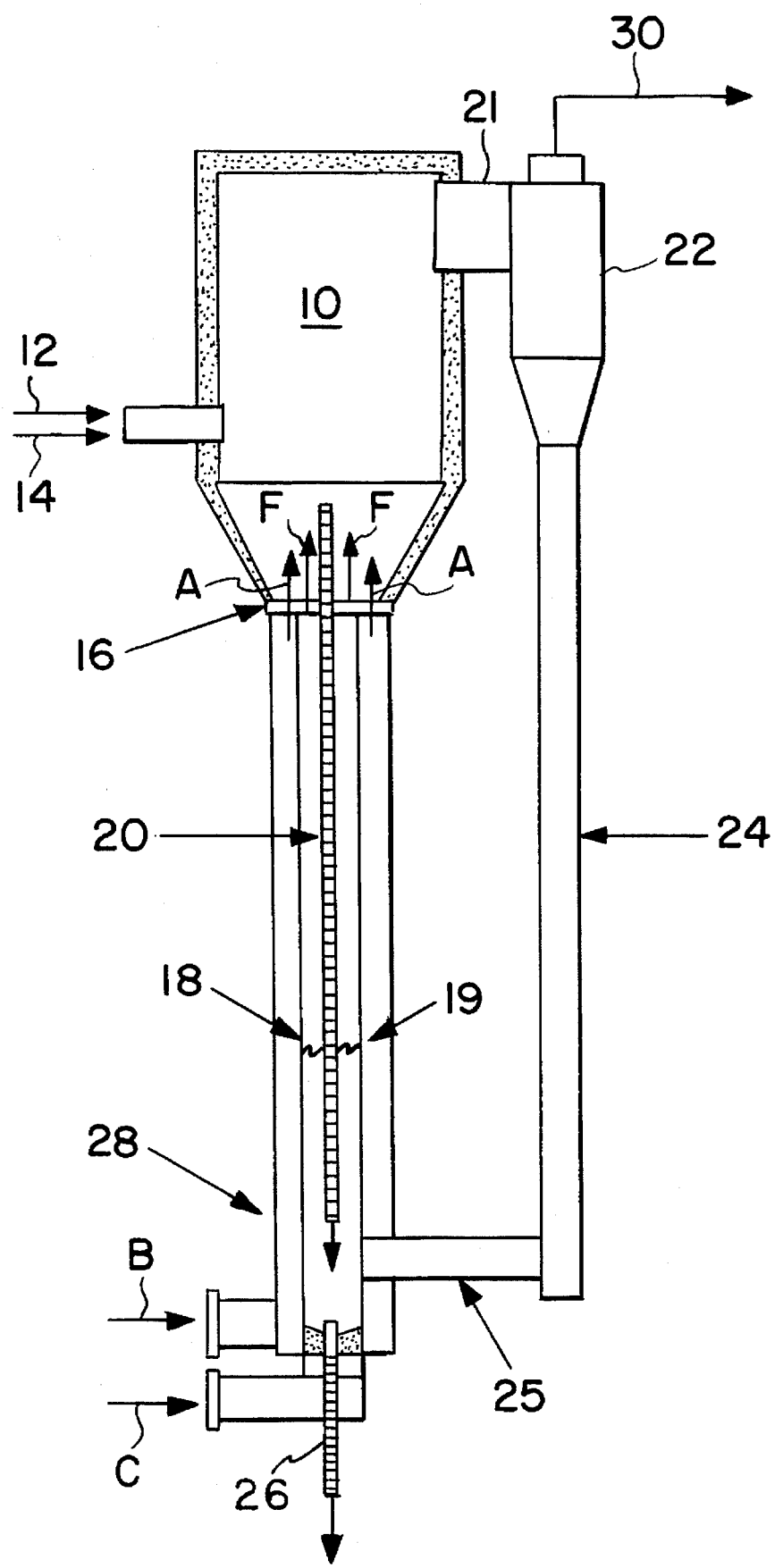

TWO STAGE CARBONIZER

This is a continuation of application Ser. No. 08/127,858 filed Sep. 28, 1993 now abandoned.

BACKGROUND OF THE INVENTION

1. Field of the Invention

The present invention relates in general to a carbonizer or pyrolyzer, and in particular to a two stage carbonizer.

2. Description of the Related Art

A carbonizer or pyrolyzer is a device that drives off the volatile matter of a fuel such as coal to produce gas, liquid tars and oils, and char consisting of mostly carbon. In the 1970's, FMC Corp. developed a process known as COED that pyrolyzed coal to produce a gas containing $H_2$, CO, $CH_4$ and a liquid product for gasoline production. This process was an enhanced version of an earlier process called Form-Coke, also developed by FMC Corp. FormCoke also pyrolyzed the coal at about 950° F. to 1000° F. to produce tar and char. The tar was conditioned and then recombined with the char. The mixture was heated to about 1500° F. to produce a coke product. This process was able to produce coke from non-coking coals cleanly. A plant using this process was built in Kemerer, Wyoming and produces around 93,000 tons per year of coke. The difference between the FormCoke and COED processes was that for the COED process, the char product was burned and the resulting flue gas provided heat to pyrolyze the coal.

Other companies have developed devices to produce synthetic methane gas by similar processes however the temperatures were increased to reduce tars and oils. Higher temperatures thermally crack the tars to produce $H_2$, CO, and $CH_4$. Blast furnace coke production pyrolyzes the coal at temperatures above the ash softening temperature. The tars produced are sought after for their chemicals. The long chain cyclic hydrocarbons (coal tars) are cracked into various mixtures of paraffins, olefins, and cyclic and aromatic hydrocarbons.

Recently, the idea of pyrolyzing coal at higher temperatures, which is now termed mild gasification, to produce a low Btu gas and a char is under investigation in an advanced pressurized fluidized bed combustion cycle (PFBC). Also, addition of limestone and dolomite have provided sulfur removal characteristics. The low Btu gas is used to increase the temperature of the flue gas from a PFBC to increase cycle efficiency and to burn the char in the PFBC. Currently, several companies are pursuing mild gasification for this purpose. Other companies have also begun to develop advanced PFBC cycles. The main thrust of the new carbonizers or mild gasification development is to produce a gas and char with no tars or oils. The addition of sorbent to the carbonizer enhances the cracking of the long chain hydrocarbon that make up the tars at lower temperatures.

Thus, there is a need for a device which places as much heat as possible into the gas streams entering the carbonizer to drive off volatile matter and reduce tars and oils by thermal cracking. It is desirable to add sorbent to enhance the thermochemical reaction by aiding in the cracking of the tars.

SUMMARY OF THE INVENTION

The present invention solves the aforementioned problems with the prior art as well as others by providing a two stage carbonizer. This improved apparatus for thermochemical reaction includes a carbonizer which contains a bed of fluidizable material connected to a combustor. The combustor generates flue gas which acts as one of two fluidizing mediums for the carbonizer. The hot flue gas from the combustor rises up a central tube to preheat carbonizer air in an outer tube. The air from the outer tube acts as the second fluidizing medium. Coal and sorbent are pneumatically conveyed into the carbonizer by a dense phase transport system for combustion. An overflow pipe in the carbonizer removes char and spent stone to the combustor for further combustion.

Accordingly, one object of the present invention is to provide an improved apparatus for thermochemical reaction with a two stage carbonizer.

Another object of the present invention is to provide an improved method for thermochemical reaction using the two stage carbonizer.

Still, a further object of the present invention is to provide a device that is simple in design, rugged in construction, and economical to manufacture.

The various features of novelty characterizing the invention are pointed out with particularity in the claims annexed to and forming a part of this disclosure. For a better understanding of the invention, the operating advantages attained by its uses, reference is made to the accompanying drawing and descriptive matter in which the preferred embodiment of the invention is illustrated.

BRIEF DESCRIPTION OF THE DRAWING

In the drawing:

The single drawing figure is a cross sectional elevational view of the present invention.

DESCRIPTION OF THE PREFERRED EMBODIMENT

Referring to the single drawing figure, the present invention places as much heat as possible into the gas streams entering the carbonizer (10) to drive off volatile matter and reduce tars and oils by thermal cracking. A sorbent such as limestone or dolomite is added to enhance the reduction of tars and oils, to aid in cracking the tars, and absorb any sulfur in the form of $H_2S$ formed during the combustion process.

Coal (12) and sorbent (14) are pneumatically conveyed from a source (not shown) by a dense phase transport system into the carbonizer (10). Dense phase transport limits the amour of air required to transport the solids stream. The carbonizer (10) is essentially a closed vessel except where indicated and operates as a fluidized bed with high velocity fluid jets passing through grid plates (16) at its bottom to mix the bed properly.

The coal (12) and sorbent (14) enter the carbonizer (10), they are contacted by at least two fluid streams which are preferably gas streams. One of the gas streams is preferably preheated air (A) and the other is flue gas (F) generated from a combustor (18). The coal (12) is devolatilized and partially combusted in the carbonizer (10). Also, the sorbent (14) absorbs any sulfur in the form of $H_2S$ and forms calcium sulfide, (CaS). Preferably, the carbonizer (10) operates at temperatures around 1600° F. The char and spent stone from the combusted coal and sorbent as well as any other partially combusted material enter an overflow pipe (20) which connects the carbonizer (10) with the combustor (18). Any solid fines which leave the carbonizer (10) are collected with a hot cyclone (22) and returned to the bottom of the combustor (18) through a cyclone stand pipe (24) and elbow (25).

The combustor (18) burns a portion of the char and the remaining volatile matter and converts part of the CaS to $CaSO_4$ which remains in the solids level (19). The combustor operates at temperatures below the slagging temperature of the ash. The remainder of the char and the spent stone and other combusted material exit the combustor (18) through a pipe (26) located in the floor for disposal. The combustor can include a refractory lining.

As seen in the single drawing figure, preferably the combustor (18) is the center tube of an annulus created by a concentric or coaxial air tube (28). The combustor (18) is axially aligned with and concentrically situated in the air tube (28). The combustor (18) generates hot flue gases which rise up the center of the tube of the combustor (18) and pass through the grid plate (16) as shown by arrow F into the carbonizer (10). Also, combustor (18) preheats the carbonizer air and/or steam which is supplied to the air tube (28) by arrow B from a source (not shown). Combustion air and/or steam is provided to the combustor (18) by way of arrow C from a source (not shown). The amount of the air and/or steam allowed to enter the combustor is controlled to limit the temperature in the carbonizer below 2,000° F. thereby not requiring any in-bed cooling surface. The total air to the 2-stage carbonizer remains sub-stoichiometric for coal combustion. The preheated air and/or steam A acts as a second fluidizing medium for the carbonizer (10) as it passes through the grid plates (16).

The fluidized bed operation of the carbonizer (10) is above the normal fluidizing velocity in the carbonizer to promote mixing with the hot gases from the combustor (18). This allows the coal to be devolatilized and to thermally crack the tars and oils due to the direct contact of the coal and the hot flue gas. As mentioned earlier, the products from the carbonizer (10) exit through duct (21) into the hot cyclone (22) where the solids are reinjected into the bottom of the combustor (18). The product gas exits the hot cyclone (22) through duct (30) for further processing, reaction, or discharge.

Advantageously, air tube (28) acts as a pressure seal for the combustor (18) and as such allows the device to operate at high pressures ranging from about 12–20 atmospheres (atm).

The operation of the two stage carbonizer is meant to be flexible since the air to the carbonizer and combustor are adjustable independently. When increasing air flow to the carbonizer, the coal flow increases thereby increasing temperature and level of gasification. Also, steam may be injected to promote more gasification.

While a specific embodiment of the invention has been shown and described in detail to illustrate the application of the principles of the invention, it will be understood that the invention may be embodied otherwise without departing from such principles.

I claim:

1. An apparatus for thermochemical reaction, comprising:
    a carbonizer for containing a bed of fluidizable material, said carbonizer having a grid plate located at a bottom of said carbonizer;
    means for introducing fuel and sorbent into said carbonizer for partial combustion therein, said sorbent absorbing pollutant emissions from the combustion products;
    a combustor connected to said bottom of said carbonizer, said combustor generating flue gas which acts as one of at least two fluidizing mediums for fluidizing said bed of said carbonizer;
    an outer tube connected to said bottom of said carbonizer, said combustor being situated concentrically inside and entirely within said outer tube for defining an annulus between said combustor and said outer tube for supplying a second fluidizing medium to said carbonizer through said grid plate, said combustor preheating said second fluidizing medium supplied through the annulus to said carbonizer; and
    means for removing partially combusted material from said carbonizer, said partially combusted material removing means being connected to said combustor for supplying the combusted material thereto.

2. An apparatus as recited in claim 1, further comprising a cyclone connected to said carbonizer for collecting solid fines therefrom and returning the solid fines to said combustor for combustion.

3. An apparatus as recited in claim 2, further comprising means for removing combusted material from said combustor, said means for removing combusted material discharging the combusted material from said combustor for disposal.

4. An apparatus as recited in claim 3, wherein said means for removing combusted material comprises a pipe located in a floor of said combustor.

5. An apparatus as recited in claim 1, wherein said means for removing partially combusted material comprises an overflow pipe located in said carbonizer and connected with said combustor.

6. An apparatus as recited in claim 1, wherein said outer tube is connected to said grid plate at the bottom of said carbonizer.

7. An apparatus as recited in claim 6, wherein said combustor comprises a central tube positioned concentrically in said outer tube connected to said bottom of said carbonizer.

8. An apparatus as recited in claim 7, wherein said outer tube connected to said bottom of said carbonizer provides a pressure seal for said combustor to allow operation at a pressure ranging from about 12 to 20 atmospheres.

* * * * *